Inventors
Laurens Hammond
& John M. Hanert

Patented Apr. 6, 1948

2,439,295

UNITED STATES PATENT OFFICE 2,439,295

SPEED RESPONSIVE APPARATUS

Laurens Hammond, Chicago, and John M. Hanert, Park Ridge, Ill., assignors to Hammond Instrument Company, Chicago, Ill., a corporation of Delaware Original application June 14, 1943, Serial No. 490,746. Divided and this application March 10, 1945, Serial No. 582,135

4 Claims. (Cl. 177—311)

Our invention relates generally to speed responsive apparatus and more particularly to means for indicating the angular ground speed for aircraft.

The measurement of ground speed of an airplane is in general a rather difficult problem and usually requires a great deal of expensive precision apparatus if reasonable accuracy is to be attained. It has usually been determined by calculation involving a determination of air speed, altitude, drift and similar factors. In some instances it is not necessary to determine the actual ground speed, but it is sufficient to determine the angular speed of the plane relative to a point on the terrain beneath it.

The apparatus of our invention may be utilized to determine such angular speed directly, so that if the altitude of the aircraft is known, the ground speed may be quickly calculated.

It is thus an object of our invention to provide an improved apparatus for determining the angular speed at which an airplane moves relative to the terrain.

A further object is to provide an improved indicator for the ground speed of aircraft, or for indicating the angular speed of any other objects.

Other objects will appear from the following description, reference being had to the accompanying drawings in which.

This application is a division of our copending application Serial No. 490,746, filed June 14, 1943, which has matured into Patent No. 2,408,930, issued October 8, 1946.

Figure 1:
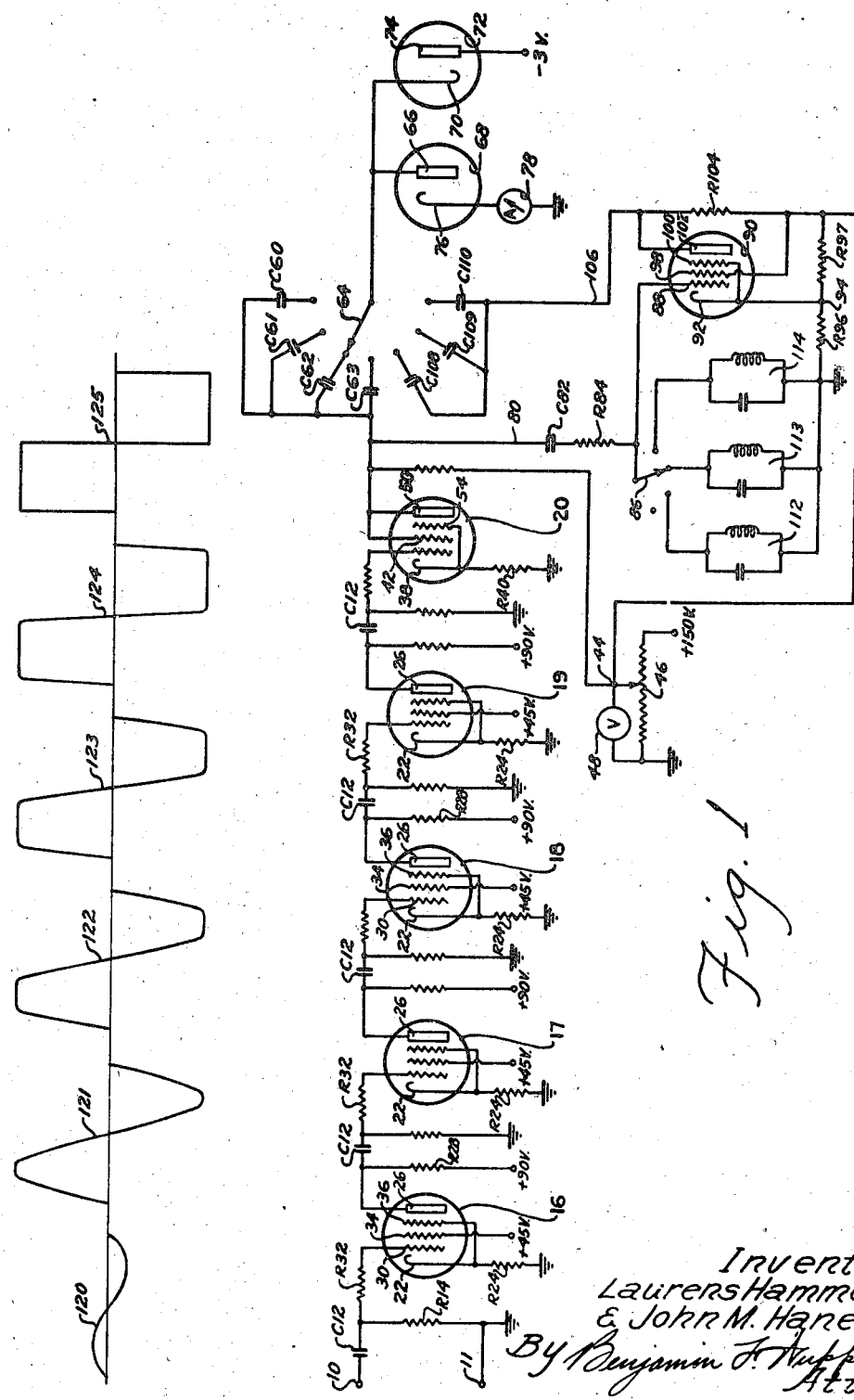
Figure 1 is a circuit diagram of the frequency measuring portion of the apparatus.

Referring to Fig. 1 the frequency measuring portion of the apparatus may comprise a distorting and amplifying system having input terminals 10, 11 which are resistance coupled through a blocking condenser C12, across a grid resistor R14, to the input of an electron discharge device 16 forming the first of a cascaded series of distorting and amplifying tubes. In addition to the tube 16 the successive stages of this distorting and amplifying system include tubes 17, 18 and 19 and a power driver tube 20. The tubes 16 to 19 may be pentodes of the 6SJ7 type while the tube 20 may be of the 6K6GT type. The cathodes 22 of the tubes 16 to 19 are respectively connected to ground through self-bias resistors R24 while their plates 26 are connected to a suitable source of plate voltage indicated as a terminal +90 v., through load resistors R28. The control grid 30 of tube 16 has a series grid resistor R32 in addition to the grid resistor R14. The screens 34 of the tubes 16 to 19 are connected to a suitable source of screen voltage indicated as a terminal +45 v. The blocking condensers C12 couple the output plate circuits of each of these tubes to the succeeding tube of the cascaded series. The suppressor grids 36 of tubes 16 to 19 are connected to the cathodes 22.

The tube 20, operating substantially as a triode, forms a low impedance driver and has a cathode 38 connected to ground through a self-bias resistor R40, while its screen grid 42 is connected to the plate 50, the latter being connected to a terminal 44, the potential of which is controlled by potentiometer 46 connected between ground and a source of screen and plate voltage, indicated as a terminal +150 v. The adjustment of the potentiometer 46 is made so as to have the voltage upon the screen 42 and plate 50 at +135 v. under the given conditions. Upon changes in line voltage the slider of the potentiometer 46 is adjusted to bring the screen voltage back to its proper value, and for convenience in making this adjustment a voltmeter 48 is preferably provided, its terminals being connected between ground and the slider of the potentiometer 46. Any other suitable means for controlling the voltage of the terminal 44, to compensate for changes in line voltage could, of course, be substituted for the manually adjusted potentiometer 46. The suppressor grid 54 of this tube 20 is internally connected to the cathode 38 thereof.

The plate 50 has connected thereto a plurality of condensers C60, C61, C62 and C63, the other terminals of these condensers being connected to switch points of multi-contact switch 64. The switch arm 64 is connected to the plate 66 of a diode 68 and to the cathode 70 of a diode 72. The plate 74 of the diode 72 is connected to a suitable constant potential source indicated as −3 v. The cathode 76 of the diode 68 is connected through a direct current milliammeter 78 to ground.

The plate 50 is also connected by a conductor 80, blocking condenser C82 and a decoupling resistor R84 to a multi-contact switch arm 86 and also to the control grid 88 of a pentode 90.

The pentode 90, which may be of the 6K6GT type, comprises a cathode 92 connected to a junction 94 between voltage dividing resistors R96 and R97. These voltage dividing resistors are preferably wire wound resistors of low value. The resistors R96 and R97 are connected in series between ground and the terminal 44, which, as previously noted, is adjusted to be maintained at +135 volts. The screen grid 98 of the pentode 90 is likewise connected to the terminal 44 while the suppressor grid 100 is internally connected to the cathode 92. The plate 102 of the pentode 90 is connected to the terminal 44 through a load resistor R104 and is also connected by a conductor 106 to terminals of condensers C108, C109 and C110, the other terminals of these condensers being respectively connected to switch points engageable by the switch arm 64.

A plurality of tuned meshes 112, 113 and 114 are adapted to be connected selectively across the input of the pentode 90 by operation of the switch 86. Each of these meshes 112 to 114 comprises a condenser and inductance connected in parallel to provide impedances varying with frequency. For example, the mesh 112 may be tuned to resonate at 40 C. P. S., the mesh 113 at 75 C. P. S., and the mesh 114 at 1250 C. P. S. It will appear hereinafter that these frequency-responsive meshes are utilized when measuring frequencies close to 32, 60 and 1000 C. P. S. respectively.

In utilizing the instrument the frequency to be measured is impressed across the input terminals 10, 11. The input signal, with the degree of amplification and distortion as shown, should exceed 5 millivolts. Due to the non-linear properties of the system, the signal may be of any voltage above this value. Presumably the frequency to be measured is a sine wave, or a wave closely approaching a sine wave and such input wave is indicated at 120. The input wave may be of saw-tooth, rectangular, triangular or of any other generally symmetrical shape.

The sharp cutoff tubes 16 to 19 of the 6SJ7 type, supplied with the potentials indicated, operate in a class A manner with a gain of 40 only when their grids are supplied with very small signals. Thus it is apparent that for very minute signals upon the control grid of the tube 16, the cascaded series of tubes 16 to 20 constitute a very high gain amplification system. When the input signal is increased this cascaded system operates nonlinearly and limits the amplitude of the signal as delivered by the plate of the tube 20 to a constant value.

This limiting action is made clear by reference to the representative output waves 120 to 125 of the different tubes, shown directly above the tubes. The wave 121 is substantially a sine wave since it is assumed that the input signal is relatively small and the tube 16 is not driven far beyond the point at which it operates non-linearly. However, in the event that an exceedingly high input signal is present, series resistor R32, which is of high value, such as 2 megohms, serves to limit the extent to which the signal may swing the control grid 30 in a positive sense. As soon as the grid tends to go positive with respect to the cathode, a voltage division occurs between the resistor R32 and the cathode-to-grid input impedance of the tube 16, which will be much less than 2 megohms. Thus, further positive increases in the signal voltage have negligible effect in driving the control grid 30 in a more positive direction.

The resistor R24 may be of 4000 ohms. Under these conditions the average plate current will remain constant regardless of the input signal amplitude. When the signal drives the grid positive, as explained above, to produce a flattening of the positive portions of the signal wave, the relatively sharp cutoff point of the tube 16 will cause a corresponding flattening of the negative portion of the signal wave. By selecting a 4000 ohm self-bias resistor and 100,000 ohm plate resistor R28, the distorted input wave becomes symmetrical about the horizontal axis.

The second stage of amplification comprising the tube 17, operates in a similar manner, but since the input signal to this tube is presumably of greater amplitude, this tube will introduce appreciable distortion in the signal, and its output waves will be generally of the shape indicated by the wave 122. Similarly tubes 18 and 19 forming parts of the third and fourth stages of amplification, will further amplify and distort the signal waves to more pronounced rectangular shapes, such as illustrated by the waves 123 and 124.

The final stage of amplification, which includes the driver tube 20, will further distort the wave to a substantially perfect rectangular shape as indicated by the wave 125.

In the foregoing description of the operation of the amplifier it was assumed that a sine wave signal was being amplified. Because of the fact that the tube 20 has its output limited in amplitude, and because the gain of the amplifier is very high, a signal of very small amplitude supplied to the input of the tube 16 will produce a wave, such as the wave 125, of maximum amplitude in the output of tube 20. Furthermore, any input wave of higher amplitude will likewise produce a wave substantially identical with the wave 125. Thus the output of the amplifier is substantially the same, particularly as to the lower order harmonics of the output signal and the root-mean-square value, irrespective of the amplitude of the input signal. As is well known to those skilled in the art, the harmonic series of a rectangular wave shape such as the wave 125 may be represented by a Fourier series of a fundamental and odd numbered harmonics. The third harmonic has an amplitude one-third of the amplitude of the fundamental; the fifth harmonic has an amplitude one-fifth of the fundamental; the seventh harmonic has an amplitude one-seventh of the fundamental; etc. For a true rectangular wave the harmonic series is thus of infinite extent, which, of course, is not achieved in practice. However, the values of the fundamental and lower order odd harmonics and of the root-mean-square value are substantially independent of the exact degree of steepness of the sides of the generally rectangular wave.

As will be apparent by comparison of the output waves of the successive stages of amplification, the wave becomes of more nearly true rectangular shape as the signal is transmitted through the successive stages. These changes in wave shape, after the wave has attained a generally rectangular shape, e. g., wave 123, result mainly in an increase in the amplitudes of the higher order harmonics of the Fourier series but do not appreciably affect the amplitude of the lower order harmonics nor do they appreciably affect the root-mean-square value. Thus there will be no appreciable changes in their amplitude in the output of the tube 20 provided the input signal is above the predetermined minimum value of .005 volt. It is thus apparent that the signal as delivered by the last of these tubes is strikingly independent of the amplitude and wave shape of the input signal, and large changes thereof have no appreciable affect upon the amplitude and root-mean-square value of the output signal.

Assuming that the approximate frequency of the input signal is not known, the operator will move to the switch arm 64 to the position such that the condenser C63 is in the circuit. The output wave 125 will thus be transmitted to the diodes 68 and 72 which operate as a half-wave rectifier to transmit the energy of the positive portion of the wave to the milliammeter 78. The ammeter is preferably of good sensitivty such as provided by a zero to one milliampere range. The value of the condenser C63 is such that when the switch 64 connects this condenser in series in the circuit and the input signal has a frequency of 10,000 C. P. S. the milliammeter 78 will indicate its full scale one milliampere reading. Assuming that the input frequency is 8 C. P. S., the deflection of the needle of the ammeter 78 will be extremely small under the given conditions. The operator will therefore shift the switch arm 64 to bring the condenser C62 in the circuit, this condenser being of such value that an input of frequency of 1000 cycles will produce full scale deflection of the needle of the ammeter 78. At the assumed input frequency of 8 C. P. S., the ammeter 78 will still fail to provide an appreciable deflection and the operator will therefore shift the switch arm 64 to bring the condenser C61 in the circuit. This condenser is of such value that an input frequency of 100 C. P. S. will cause full scale deflection of the meter 78. Under these circumstances the 8 cycle input frequency will produce a deflection of the indicator of the ammeter which will be readable. The operator will note that the reading is below the "0.1" mark of the ammeter scale and will therefore make the final shift of the switch arm 64 to the contact which brings the condenser C60 in the circuit. The condenser C60 is of such value that an input frequency of 10 C. P. S. will produce full scale deflection of the meter 78. When the apparatus has thus been brought to final adustment the operator will read directly from the meter the value of approximately 0.8 which will, of course, be interpreted as a frequency of 8 C. P. S. Of course, the meter 78 will in practice be frequency calibrated so as to be direct-reading.

If the operator knows the approximate value of the frequency being measured, it will not be necessary for him to successively shift the switch arm 64 as described but he may set it immediately to the range within which the frequency lies.

When the switch 64 is in its most sentitive position for a given input frequency (the setting with the condenser C60 in circuit in the above example) the current drawn through this condenser, the diodes 68 and 72, and meter 78 constitutes a load upon the output of the driver tube 20 and this will result in some distortion of the output wave 125. The diode 72 effects the discharge of the condenser C60 as well as providing a low impedance shunt path —3 v. for the negative portion of the output wave.

When the input frequency is known to be very close to a certain frequency, such as is the case in power line frequencies, the appropriate condenser C108, C109 or C110 is connected in the circuit by the switch arm 64 and correspondingly the switch arm 86 is shifted to connect the appropriate mesh 112, 113 or 114 across the input circuit of the pentode 90. For this purpose the switch arms 86 and 64 may be mechanically inter-connected.

Assuming that the input frequency is known to be approximately 32 C. P. S., greatly increased sensitivity of the meter may be obtained by moving switch arm 86 to a position to connect mesh 112 in the input circuit of the pentode 90 and at the same time moving switch arm 64 to bring the appropriate condenser C108 in the meter circuit.

As described above, the mesh 112 is designed to be resonant at 40 C. P. S. The condenser C108 is of such value that when it is connected in the circuit, and an input frequency of 35 C. P. S. applied, the meter 78 reads its full scale value of one milliampere. For frequencies less than 35 C. P. S. the meter reading will drop very rapidly due to the effect of the threshold bias which is developed in the voltage divider resistor R96. By increasing the amount of this threshold bias on the control grid of the tube 90, the sensitivity of the frequency meter increases very rapidly. Inasmuch as the frequency meter in this condition if effective to measure the fundamental component of the distorted signal wave 125, changes in input amplitude at the terminals 10, 11 are substantially ineffective to change the amplitude of the fundamental of the complex wave 125. However, small changes in signal frequency result in corresponding changes in amplitude of signal occurring across the mesh 112 which is connected to the control grid 88. These relatively small amplitude changes causes a very large change in the average plate current because of the presence of the threshold bias as provided by the voltage drop occurring in the resistor R96. In using the frequency meter, advantage is taken of the steeply rising portion of the impedance characteristic of the mesh 112 as the input frequency approaches resonance. For instance, if the frequency range is to lie about 32 C. P. S., the resonant frequency of the mesh 112 is set at a point such as 40 C. P. S. under which conditions measurements may be made of frequencies between 28 and 35 C. P. S. Because of the threshold bias on the rectifier tube 90, frequencies below a predetermined minimum such as 28 C. P. S. are ineffective to produce appreciable plate current pulsations. Thus, by using the correct amount of threshold bias, the frequency range of the meter may be compressed to any extent desired. For measuring commercial power frequencies, such as 60 C. P. S., the switch arm 64 is set to connect with condenser C109 and the switch arm 86 simultaneously set to connect mesh 113 (tuned to approximately 75 C. P. S.) in the input circuit of tube 90. For measurement of frequencies in the 1000 C. P. S. range, the switch arm 64 may be connected to condenser 110 and the switch arm 86 set to connect mesh 114 (tuned to approximately 1250 C. P. S.) in the input circuit of tube 90.

Figure 2:
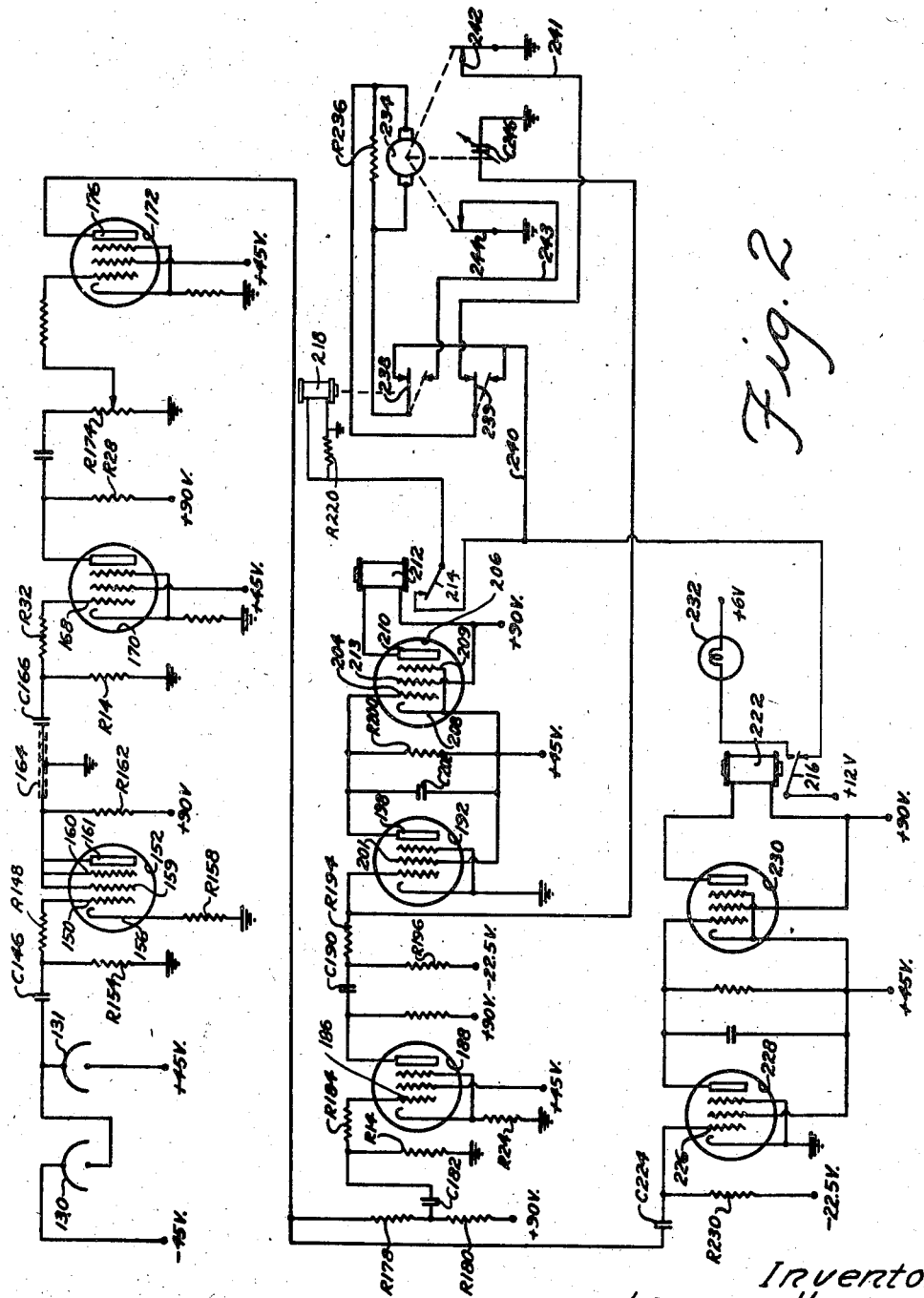
Figure 2 is a circuit diagram of a modified form of the speed responsive apparatus.
Figure 3:
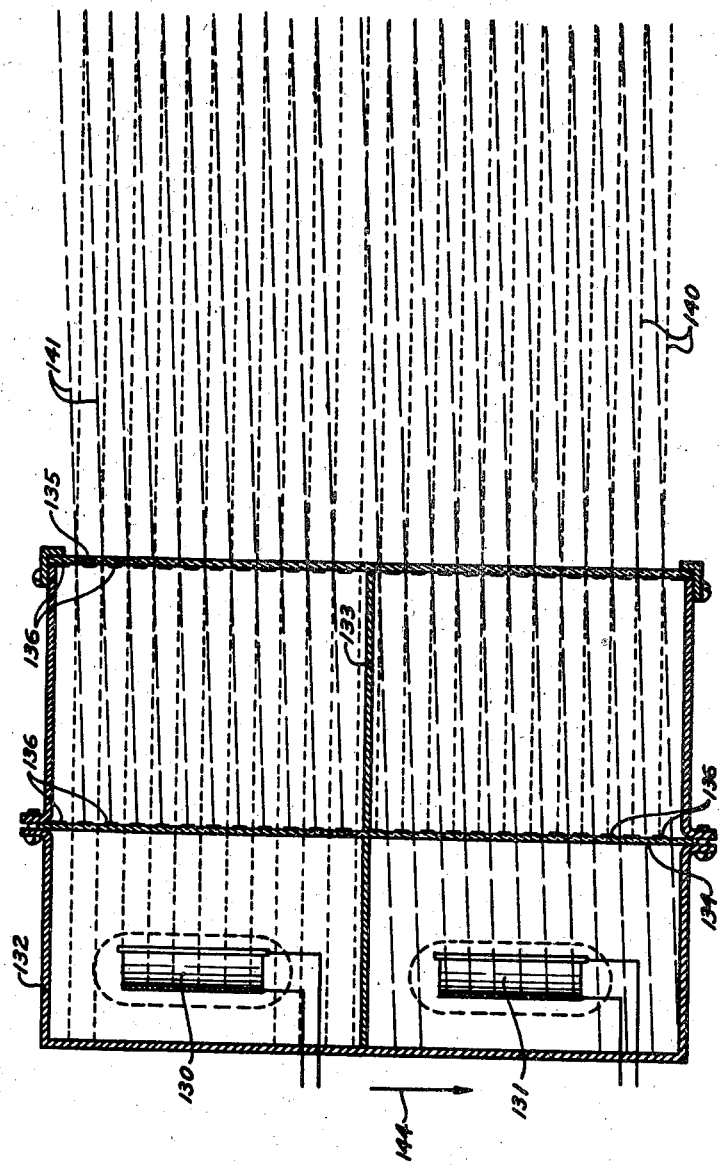
Figure 3 is a diagram of the optical portion of the speed responsive apparatus shown in Fig. 2.

The circuit and mechanism shown in Fig. 1 may be utilized as a part of the apparatus illustrated in Figs. 2 and 3. In these figures the frequenecy responsive circuit forms part of an angular speed indicator, as for example indicating the ground speed of aircraft.

In this use of the invention a pair of phototubes 130, 131 are mounted in a suitable case 132 having a dividing partition 133 therein. A pair of light grating plates 134, 135 of glass or other suitable transparent material are mounted in spaced relation in the case 132, the plates being accurately positioned and clamped by any suitable means so as to lie in parallel planes.

The grating plates 134, 135 have alternate opaque and transparent portions extending in parallel lines transversely thereof. A simple method of making these gratings is to coat sheets of plate glass with an aqueous solution of colloidal graphite. After this coating is dried and set, portions thereof are removed therefrom as by scraping it, using a milling or other precision machine for accurately spacing the lines and assuring their parallelism. For example the colloidal graphite lines may be in the order of .020" in width and may extend the full width of the glass plates. In a particular embodiment of the invention the rule portions of the plates 134, 135 were approximately 3.5" by 7" and the spacing between the plates was 2". In Fig. 3 the opaque lines of colloidal graphite upon the plates 134 and 135 are indicated by the heavy dash lines 136.

The casing 132 is mounted on the airplane so as to have a clear view downwardly therefrom, and as a result, rays of light from the ground will pass through the transparent portions of the plates 134, 135. However, it will be noted that in the lower half of the grating 135 the opaque lines 136 are staggered with respect to the opaque lines of the grating 134 in a manner such that rays striking the grating 135 perpendicularly and passing therethrough will be stopped by the opaque lines of the grating 134. On the other hand, rays striking the upper portion of the grating 135 perpendicularly and passing through the transparent portions thereof will also strike and pass through the transparent lines of grating 134. This is indicated in Fig. 3 by the fact that perpendicular rays 140 are stopped by the lower portion of the grating 134 and thus do not have an opportunity to affect the phototube 131, while such rays striking the upper portion of the grating 135 pass through the transparent lines thereof and also pass through the transparent lines of grating 134 and may thus fall upon the sensitive surface of the phototube 130.

On the other hand rays of light 141 striking the lower portion of the grating 135 at certain angles pass through the transparent portions thereof and also strike and pass through the transparent lines of grating 134 and thus may reach the sensitive surface of the phototube 131. Rays 141 passing through the upper portion of grating 135 are stopped by the opaque lines of the grating 134.

Thus, as the apparatus moves in the direction represented by the arrow 144, or in the opposite direction, a stationary source of light would alternately energize the phototubes 130 and 131. Since, as shown in Fig. 2, the cathode of phototube 130 and the plate of phototube 131 are connected through capacitor C146 and the grid resistor to the control grid 150 of the preamplifier pentode 152, an increase in the illumination of phototube 130 will cause the potential on the grid 150 to decrease, while an increase in the illumination of the phototube 131 will cause an increase in the potential of the control grid 150. Due to the positions of the gratings, the probabilities are that a light source (having relative angular movement with respect to the gratings) will alternately supply increased illumination to the phototubes 130, 131. Therefore the output signal due to scanning a single light source would tend to be a sine wave of approximately twice the amplitude of the wave which would be produced if but a single phototube and a single set of gratings were employed.

Because of the large number of light slits, a single point source of light being scanned will produce an extended series of generally sine wave impulses, thereby greatly improving the reliability with which the frequency of the signal may be determined. With the gratings of the dimensions indicated above, a complete cycle of energization of the phototubes 130, 131 would take place as the light source and the gratings shift relatively through an angle in the order of 1°10'. Consequently the relative angular speed of a light source and the phototubes may be determined by measuring the frequency generated by the phototubes, and the relative linear speed may be computed if the distance from the source is known.

In utilizing the apparatus as a ground speed indicator for aircraft the altitude of the plane may be quite accurately determined by conventional instruments and thus the frequency at which the phototubes 130, 131 are alternately energized will constitute a measure of the ground speed of the plane. There will, in nearly all cases, be sufficient irregularities or discontinuities in the level of illumination of different portions of the ground to differentially energize the phototubes 130 and 131. Of course, if all portions of the terrain reflected light uniformly, no signal would be generated in the phototubes, but experience has shown that the intensity of light radiation from adjacent portions of the terrain vary considerably even though to the eye they may appear to be relatively uniform. Thus any slight irregularities such as a bush, a tree, a fence or a whitecap may produce sufficient discontinuity in the intensity of radiation from the field scanned by the phototubes, to produce a significant signal therein. The illumination of the phototubes 130, 131 as they scan a source of illumination, produces electrical signal waves which are generally triangular shape, corresponding to the linear increase and decrease in illumination as rays from the light source which have passed through the grating of the plates 135 traverse the grating of plate 134. The signals produced by the two phototubes will be 180 degrees out of phase because of the fact that the gratings 134 and 135 in front of the phototube 131 are staggered, while the gratings in front of the phototube 130 are in alignment.

As best shown in Fig. 2 the phototubes 130, 131 are connected in series, the cathode of the phototube 130 being connected to a suitable source of negative potential, as a terminal —45 v., while the anode thereof is connected to the cathode of phototube 131. The anode of the latter phototube is connected to a suitable positive potential source, indicated as a terminal +45 v. The anode of phototube 130 and cathode of phototube 131 are connected through a blocking condenser C146 and radio frequency filter resistor R148 to the grid 150 of an amplifier tube 152 which may be of the 6J7 type. A grid resistor R154 of relatively high value is connected in series with the resistor R148 in the input circuit of the tube 152. The cathode 156 of tube 150 is connected to ground through a self-bias resistor R158. The screen grid 159 and suppressor grid 160 are connected to the plate 161 so as to cause the tube to operate as a triode in a linear manner. A plate load resistor R162 is connected between the plate 161 and a suitable plate voltage source indicated as a terminal +90 v.

Because tube 152 is utilized in the circuit as a triode it offers the advantage of low plate impedance, and because of its high impedance input circuit this tube is preferably located within or immediately adjacent the casing 132 and is resiliently supported to avoid the introduction of microphonic disturbances.

The output of the tube 152 is transmitted through a shielded conductor 164 to a blocking condenser C166. The grid 168 of an amplifying and distorting pentode 170 is connected to the condenser C166 through a series grid resistor R32 and is connected to ground through the grid resistor R14. The pentode 170 corresponds in function and in its associated circuit elements with the tube 17 of Fig. 1 and is coupled to a tube 172 which corresponds to the tube 18 of Fig. 1. The coupling is through a sensitivity control potentiometer R174.

Plate 176 of the tube 172 is connected through voltage dividing load resistors R178 and R180 to a +90 v. terminal. The junction of the resistors R178 and R180 is connected through a blocking condenser C182 and a series resistor R184 to the grid 186 of a pentode 188 which may be of the 6SJ7 sharp cutoff type. The pentode 188 is provided with a grid resistor R14 and a self-bias resistor R24. The other electrodes of the pentodes 188 are connected to suitable fixed potential sources, and the output signal, which is a wave rectangular shape corresponding to the wave 125 of Fig. 1, is transmitted through a blocking condenser C190 to the input circuit of a pentode 192, through a current limiting grid resistor R194. A grid resistor R196 in series with the resistor R194 is connected to a suitable biasing potential source indicated as a terminal −22.5 v. which constitutes a large negative grid bias for this type of tube, so that this tube operates in the manner of the grid controlled rectifier having a high input threshold.

The plate 198 of the pentode 192 is connected through a plate load resistor R200 to a suitable plate voltage source, indicated as +45 v., to which the screen 201 of this tube is also connected. A by-pass condenser C202 is connected in shunt with the load resistor R200. The plate 198 is also directly connected with the grid 204 of a pentode 206. The cathode 208 of the tube 206, as well as its suppressor grid 209, is connected to a +45 v. terminal. The plate 210 of the pentode 206, which is a power tube and may be of the 6K6GT type, is connected through the winding of a relay 212 to a plate voltage source indicated as a terminal +90 v. The screen grid 213 of this tube 206 is also connected to the latter terminal.

It will be seen that when the pentode 192 is not conducting current the voltage on the grid 204 of the pentode 206 will be substantially +45 v. and hence the latter tube will be conducting and maintain the relay 212 energized. When, however, the pentode 192 is conducting the signal impulses the voltage drop across the load resistor R200, due to the resultant increase in plate current flow through the pentode 192, will be sufficient to cause the grid potential bias on the tube 206 to drop to substantially a cutoff value and thus cause the deenergization of the relay 212.

The relay 212 upon energization closes a switch 214 in a circuit which includes a single-pole double throw relay switch 216 and a suitable operating current source indicated as a terminal +12 v., and also the winding of a relay 218, which is shunted by an anti-spark resistor R220.

The switch 216 is operated by a cut-out relay 222. The relay 222 operates, as will hereinafter appear, to prevent effective utilization of the actuation of the relay 212 whenever the amplitude of the signal output of the pentode 172 falls below a predetermined minimum value. This minimum value is determined by the minimum amplitude signal which will cause the formation of a true rectangular wave shape in the output of the pentode 188. Unless such wave is of substantially true rectangular shape, the signal for actuating the relay 212 will not be thoroughly reliable and it is therefore desirable to prevent the effective operation of this relay under such circumstances. The voltage in the output signal of the pentode 172 is transmitted through a blocking condenser C224 to the grid 226 of pentode 228. A biasing threshold determining resistor R230 connects the grid 226 to a suitable biasing potential source indicated as a terminal −22.5 v. The output of the pentode 228 is coupled to the input of a power pentode 230 which operates, in a manner similar to the tube 206, to conduct whenever the pentode 228 is not conducting an appreciable signal and to be cut off when the pentode 228 is drawing substantial plate current.

The lower contact of the switch 216 is connected through an indicator lamp 232 to a +6 v. terminal, and a visual indication of the operation of relay 222 thus provided.

The relay 218 is adapted to control the operation of a reversible permanent magnet field motor 234, which is provided with a suitable speed governor, and is shunted by an anti-spark resistor 236. The relay 218 has single-pole double-throw switches 238 and 239 which when in the upper position shown connect a conductor 240 (normally connected to +12 v. through the switch 216) to the one terminal of the motor 234, and connect the other terminal of the motor through the switch 239 and conductor 241 to one terminal of a limit switch 242, the other terminal of which is grounded.

Similarly when the relay 218 is energized, an energizing circuit for the motor 234 is established through a circuit including the conductor 240 (at +12 volts), the switch 239, motor 234, switch 238, conductor 243 and limit switch 244 to ground. The limit switches 242 and 244 are operatively connected to the armature of motor 234 and open its above described energizing circuits when the motor is driven in one direction or the other beyond predetermined limits.

The motor 234 is connected through a suitable speed reduction gearing to the adjustable element of a variable condenser C246, the latter being connected between ground and the current limiting resistor R194 associated with the input grid of tube 192. The condenser C246 in conjunction with the current limiting grid resistor R194, forms a frequency responsive for controlling the amplitude of the signal impressed upon the circuit of the pentode 192.

To explain the function of the motor operated variable condenser C246, it will be assumed that the input frequency initially generated in the phototubes 130, 131 decreases in value. Such decreased frequency signal, after passing through the amplifying and distorting system comprising the tubes 152, 170, 172 and 188, will cause an increase in the amplitude of the signal across the input of the tube 192. This increase in the input signal amplitude to the tube 192 will usually exceed the threshold determined by the −22.5 v. bias, and the pentode 192 will thus be rendered conducting, and as a result, increase negatively the bias upon the grid of the power tube 206, effectively blocking this tube. As a result the relay 212 remains deenergized and the relay 218 likewise deenergized. Deenergization of the relay 218, through the positioning of the switches 238 and 239, reverses the polarity of the motor 234 and causes it to drive the condenser C246 in a direction to cause its capacitance to increase. As a result of the increased capacitance of the condenser C246, there is a corresponding decrease in the amplitude of the signal at the input of tube 192. The resulting decrease in current flow through this tube 192 causes an increase in the potential of the grid 204 and the tube 206 is rendered conducting and energizes relay 212. Relay 212 then energizes relay 218, and the latter, by moving switches 238, 239 to their dotted line positions, causes the motor 234 to rotate in a reverse direction, i. e., in a direction to decrease the capacitance of condenser C246. Whenever the amplifier is receiving a significant signal the motor 234 is operating either in one direction or the other. This is of advantage in that the condenser C246 is at all times increasing or decreasing its capacitance, such increase and decrease being effective to tune the input circuit for the pentode 192 to a frequency alternately slightly above and slightly below that of the input signal. The mean of these two frequencies will be that of the input signal with a high degree of accuracy. Since the motor is operating at all times, there is no lag in the response of the instrument. This is because the circuit elements, particularly the condenser C246 and series grid resistor R194, may be so designed that the two frequencies, between which the frequency response is varied, may be relatively close to one another with the result that the motor 234 will reverse its direction of rotation at very short intervals, in the order of a second or two. The drive from the motor to the movable part of the condenser C246 will ordinarily be such that the movable part of the condenser will oscillate through such a small arc that the oscillations will hardly be noticeable. Thus it will be seen, the position of the movable part of the variable condenser C246 will constitute an indication of the frequency generated by the phototubes 130, 131.

Any suitably calibrated device may be driven by the motor 234 to provide a mechanical movement responsive to the angular speed of the airplane relative to the terrain below it, or to provide a direct reading indication or record of the frequency generated by the phototubes 130, 131, or of the factor which combined with the altitude will show the ground speed.

Whenever the signal generated by the phototubes is of such low amplitude as to lack significance, the tube 228 becomes biased substantially to or beyond cutoff and the pentode 230 is thereby rendered conducting and energizes relay 222. Energization of relay 222 completes the circuit to the warning signal lamp 232, and opens the circuit by which power is supplied to the motor 234. The motor 234 can therefore no longer be controlled by the relay 218 and the contact 214, and any frequency indicating means operated by the motor 234 will remain stationary until the phototubes 130, 131 again supply a signal of significant amplitude.

When the airplane on which the apparatus is mounted is flying over an ordinary terrain, the apparatus will provide a continuous indication of the angular speed at which the ground is passing directly beneath the plane. To obtain increased accuracy, the casing 132 containing the phototubes 130, 131 may be mounted upon a gyro stabilized support, so that the phototubes always receive light from an area directly beneath the airplane and so that minor irregularities in the flight path or attitude of the airplane will not appreciably affect the operation of the apparatus.

While we have disclosed particular embodiments of the invention, it will be apparent to those skilled in the art that numerous variations and modifications of the invention may be made without departing from the underlying principles thereof. We therefore desire, by the accompanying claims, to include within the scope of our invention all such variations and modifications by which substantially the results of our invention may be obtained through the use of substantially the same or equivalent means.

We claim:

1. In an angular ground speed responsive apparatus for aircraft, the combination of a pair of phototubes, a pair of spaced gratings in front of each of said phototubes, said gratings being formed to cause parallel rays of light shifting angularly with respect to said phototubes to energize said phototubes alternately, a non-linear amplifier coupled to said phototubes capable of amplifying and distorting the signal produced by said phototubes into a signal of substantially rectangular wave shape and of constant amplitude, and a frequency responsive means coupled to said amplifier.

2. In angular ground speed responsive apparatus for aircraft, the combination of a pair of phototubes, a pair of spaced gratings in front of each of said phototubes, said gratings being formed to cause parallel rays of light shifting angularly with respect to said phototubes to energize said phototubes alternately, and a frequency responsive device coupled to said phototubes and operable to provide an indication of the frequency of the signal produced thereby.

3. In an angular ground speed responsive apparatus for aircraft, the combination of a pair of phototubes, a pair of spaced gratings in front of each of said phototubes, said gratings being formed to cause parallel rays of light shifting angularly with respect to said phototubes to energize said phototubes alternately, a non-linear amplifier coupled to said phototubes capable of amplifying and distorting the signal produced by said phototubes into a signal of substantially rectangular wave shape and of constant amplitude, and frequency responsive means coupled to the output of the amplifier 4. In angular ground speed responsive apparatus for aircraft, the combination of a pair of phototubes, a pair of spaced gratings in front of each of said phototubes, said gratings being formed to cause parallel rays of light shifting angularly with respect to said phototubes to energize said phototubes alternately, and means coupled to said phototubes to amplify the signals produced thereby to a predetermined constant amplitude, and frequency responsive means coupled to the amplifying means.

LAURENS HAMMOND.
JOHN M. HANERT.

REFERENCES CITED

The following references are of record in the file of this patent:

UNITED STATES PATENTS

| Number | Name | Date |
|---|---|---|
| 2,013,594 | Zworykin | Sept. 3, 1935 |
| 2,292,153 | Olson | Aug. 4, 1942 |
| 2,292,641 | Jones | Aug. 11, 1942 |
| 2,408,930 | Hammond et al. | Oct. 8, 1946 |